US011654899B2

(12) United States Patent
Yang et al.

(10) Patent No.: US 11,654,899 B2
(45) Date of Patent: May 23, 2023

(54) METHOD AND APPARATUS FOR AVOIDANCE CONTROL OF VEHICLE, ELECTRONIC DEVICE AND STORAGE MEDIUM

(71) Applicant: Baidu Online Network Technology (Beijing) Co., Ltd., Beijing (CN)

(72) Inventors: Fan Yang, Beijing (CN); Fan Zhu, Beijing (CN); Leibing Lv, Beijing (CN); Lin Ma, Beijing (CN)

(73) Assignee: Apollo Intelligent Driving Technology (Beijing) Co., Ltd., Beijing (CN)

( * ) Notice: Subject to any disclaimer, the term of this patent is extended or adjusted under 35 U.S.C. 154(b) by 141 days.

(21) Appl. No.: 16/916,201

(22) Filed: Jun. 30, 2020

(65) Prior Publication Data

US 2021/0001839 A1  Jan. 7, 2021
US 2022/0371581 A9  Nov. 24, 2022

(30) Foreign Application Priority Data

Jul. 1, 2019 (CN) .......................... 201910586468.6

(51) Int. Cl.
*B60W 30/09* (2012.01)
*B60W 30/18* (2012.01)
(Continued)

(52) U.S. Cl.
CPC ...... *B60W 30/09* (2013.01); *B60W 30/18163* (2013.01); *G08G 1/166* (2013.01); *G08G 1/167* (2013.01)

(58) Field of Classification Search
CPC ........... B60W 30/09; B60W 30/18163; B60W 2554/4042; B60W 2554/802;
(Continued)

(56) References Cited

U.S. PATENT DOCUMENTS

2009/0174536 A1* 7/2009 Rao .......................... B60T 7/22
340/436
2014/0142799 A1  5/2014 Ferguson et al.
(Continued)

FOREIGN PATENT DOCUMENTS

CN  107719369 A  2/2018
CN  109318890 A  2/2019
(Continued)

OTHER PUBLICATIONS

Extended European Search Report for European Patent Application No. 20165412.6 dated Oct. 5, 2020.
(Continued)

*Primary Examiner* — Abby Y Lin
*Assistant Examiner* — Hossam M Abd El Latif
(74) *Attorney, Agent, or Firm* — Harness, Dickey & Pierce, P.L.C.

(57) ABSTRACT

Embodiments of the present disclosure disclose a method and apparatus for avoidance control of a vehicle, an electronic device, and a storage medium, where the method includes: obtaining behavior information of a moving obstacle, where the moving obstacle is located in a direction of movement of the vehicle and a distance between the moving obstacle and the vehicle satisfies a preset avoidance distance; determining an avoidance strategy for the vehicle based on the behavior information of the moving obstacle; and controlling movement of the vehicle based on the avoidance strategy. The method in the embodiments of the present disclosure considers the behavior information of the moving obstacle in the process of avoidance control of the vehicle, and the vehicle can be controlled to travel when the moving obstacle takes an avoidance action, thereby improving the accuracy of avoidance for the vehicle and the practicality of intelligent driving.

18 Claims, 5 Drawing Sheets

(51) Int. Cl.
*B60W 60/00* (2020.01)
*G05D 1/02* (2020.01)
*G08G 1/01* (2006.01)
*G08G 1/16* (2006.01)

(58) Field of Classification Search
CPC ....... B60W 2720/106; B60W 2720/12; B60W 60/0027; G05D 1/0223; G05D 1/0246; G05D 2201/0212; G08G 1/166; G08G 1/167; G08G 1/0129
USPC ........................................................ 701/301
See application file for complete search history.

(56) References Cited

U.S. PATENT DOCUMENTS

| | | | | |
|---|---|---|---|---|
| 2015/0224987 | A1* | 8/2015 | Tachibana | G08G 1/166 701/1 |
| 2018/0136652 | A1 | 5/2018 | Jiang et al. | |
| 2018/0141545 | A1 | 5/2018 | Freytag | |
| 2018/0259967 | A1 | 9/2018 | Frazzoli et al. | |
| 2019/0100197 | A1 | 4/2019 | Saiki | |
| 2019/0389464 | A1* | 12/2019 | Nanri | G08G 1/167 |
| 2020/0393255 | A1* | 12/2020 | Freese | G01C 21/3484 |
| 2021/0001841 | A1 | 1/2021 | Wang et al. | |
| 2021/0347357 | A1* | 11/2021 | Yang | B60Q 1/525 |
| 2022/0262236 | A1* | 8/2022 | Ueno | B60W 50/14 |

FOREIGN PATENT DOCUMENTS

| | | |
|---|---|---|
| CN | 109532743 A | 3/2019 |
| CN | 109583384 A | 4/2019 |
| EP | 3378722 A1 | 9/2018 |
| JP | 2000207691 A | 7/2000 |
| JP | 2015516623 A | 6/2015 |
| KR | 20180007799 A | 1/2018 |
| WO | 2018/113752 A1 | 6/2018 |

OTHER PUBLICATIONS

Notice of Reasons for Refusal of corresponding Japanese Patent Application No. 2020-072843, dated Mar. 19, 2021, 10 pages (in English and Japanese).

European Patent Office Action dated Apr. 26, 2022 for EP Application No. 20165412.6. (4 pages).

Office Action for corresponding Chinese patent application No. 201910586468.6 dated Nov. 23, 2021, eight pages.

* cited by examiner

METHOD AND APPARATUS FOR AVOIDANCE CONTROL OF VEHICLE, ELECTRONIC DEVICE AND STORAGE MEDIUM

CROSS-REFERENCE TO RELATED APPLICATIONS

This application claims priority to Chinese application No. 201910586468.6, filed on Jul. 1, 2019, which is incorporated by reference in its entirety.

TECHNICAL FIELD

Embodiments of the present disclosure relate to the field of intelligent driving technology, and in particular, to a method and apparatus for avoidance control of a vehicle, an electronic device and a storage medium.

BACKGROUND

With the development of intelligent driving, in order to improve the safety of autonomous driving during road traveling, it is necessary to avoid obstacles.

When an obstacle is encountered during a driving process of an intelligent driving vehicle, the current intelligent driving system will predict a movement state of the obstacle at the next moment based on the movement state of the obstacle at the current moment. When the predicted result is that a collision will occur, the intelligent driving system will take active avoidance measures, such as decelerating, stopping or the like. However, it will not consider whether the obstacle has also adopted avoidance measures, which will cause the inaccuracy of intelligent driving in the avoidance process.

SUMMARY

Embodiments of the present disclosure provide a method and apparatus for avoidance control of a vehicle, an electronic device and a storage medium, so as to improve the accuracy in avoidance control of a vehicle during the intelligent driving process.

In a first aspect, the embodiments of the present disclosure provide a method for avoidance control of a vehicle, including:

obtaining behavior information of a moving obstacle, where the moving obstacle is located in a direction of movement of the vehicle, and a distance between the moving obstacle and the vehicle satisfies a preset avoidance distance;

determining an avoidance strategy for the vehicle based on the behavior information of the moving obstacle; and controlling movement of the vehicle based on the avoidance strategy.

In an implementation of the first aspect, the determining the avoidance strategy for the vehicle based on the behavior information of the moving obstacle includes:

obtaining, based on the behavior information of the moving obstacle, a target avoidance strategy corresponding to the behavior information of the moving obstacle from a preset mapping relationship, where the mapping relationship includes a correspondence relationship between the behavior information of the moving obstacle and the avoidance strategy for the vehicle; and using the target avoidance strategy as the avoidance strategy for the vehicle.

In another implementation of the first aspect, the method further includes:

obtaining at least one set of historical training data, where each set of historical training data includes the behavior information of the moving obstacle and the avoidance strategy for the vehicle in the case of a vehicle encountering a moving obstacle; and determining the correspondence relationship between the behavior information of the moving obstacle and the avoidance strategy for the vehicle based on the at least one set of historical training data.

In another implementation of the first aspect, the method further includes:

sending the avoidance strategy for the vehicle to the moving obstacle, so that the moving obstacle determines, based on the avoidance strategy for the vehicle, a movement behavior of the moving obstacle at a next moment.

Optionally, the avoidance strategy includes at least one of accelerating, decelerating, stopping, or lane changing.

Optionally, the behavior information of the moving obstacle includes driving information or avoidance information.

In another implementation of the first aspect, the determining the avoidance strategy for the vehicle based on the behavior information of the moving obstacle includes:

determining, based on the behavior information of the moving obstacle, that the avoidance strategy for the vehicle is at least one of decelerating, stopping, or lane changing, in the case of the behavior information of the moving obstacle being the driving information.

In another implementation of the first aspect, the determining the avoidance strategy for the vehicle based on the behavior information of the moving obstacle includes:

determining, based on the behavior information of the moving obstacle, that the avoidance strategy for the vehicle is accelerating or decelerating, in the case of the behavior information of the moving obstacle being the avoidance information.

In a second aspect, the embodiments of the present disclosure provide an apparatus for avoidance control of a vehicle, including:

an obtaining module, configured to obtain behavior information of a moving obstacle, where the moving obstacle is located in a direction of movement of the vehicle, and a distance between the moving obstacle and the vehicle satisfies a preset avoidance distance;

a processing module, configured to determine an avoidance strategy for the vehicle based on the behavior information of the moving obstacle; and a controlling module, configured to control movement of the vehicle based on the avoidance strategy.

In an implementation of the second aspect, the processing module is specifically configured to: obtain, based on the behavior information of the moving obstacle, a target avoidance strategy corresponding to the behavior information of the moving obstacle from a preset mapping relationship, where the mapping relationship includes a correspondence relationship between the behavior information of the moving obstacle and the avoidance strategy for the vehicle; and use the target avoidance strategy as the avoidance strategy for the vehicle.

In another implementation of the second aspect, the obtaining module is further configured to: obtain at least one set of historical training data, where each set of historical training data includes the behavior information of the moving obstacle and the avoidance strategy for the vehicle in the case of a vehicle encountering a moving obstacle; and the processing module is further configured to determine the correspondence relationship between the behavior information of the moving obstacle and the avoidance strategy for the vehicle based on the at least one set of historical training data.

In another implementation of the second aspect, the apparatus further includes:

a sending module, configured to send the avoidance strategy for the vehicle to the moving obstacle, so that the moving obstacle determines, based on the avoidance strategy for the vehicle, a movement behavior of the moving obstacle at a next moment.

Optionally, the avoidance strategy includes at least one of accelerating, decelerating, stopping, or lane changing.

Optionally, the behavior information of the moving obstacle includes driving information or avoidance information.

In another implementation of the second aspect, the processing module is specifically configured to: determine, based on the behavior information of the moving obstacle, that the avoidance strategy for the vehicle is at least one of the decelerating, stopping, or lane changing in the case of the behavior information of the moving obstacle being the driving information.

In another implementation of the second aspect, the processing module is specifically configured to: determine, based on the behavior information of the moving obstacle, that the avoidance strategy for the vehicle is accelerating or decelerating in the case of the behavior information of the moving obstacle being the avoidance information.

In a third aspect, the embodiments of the present disclosure provide an electronic device, including: a memory and a processor;

the memory is configured to store a computer program; and the processor is configured to execute the computer program to implement the method for avoidance control of a vehicle according to the first aspect or any implementation of the first aspect.

In a fourth aspect, the embodiments of the present disclosure provide an electronic device, including: a camera, configured to take a drive test image which includes a moving obstacle, where the moving obstacle is located in a direction of movement of the vehicle, and a distance between the moving obstacle and the vehicle satisfies a preset avoidance distance; and a processor, configured to obtain behavior information of the moving obstacle based on the drive test image taken by the camera, determine an avoidance strategy for the vehicle based on the behavior information of the moving obstacle, and control movement of the vehicle based on the avoidance strategy.

In an implementation of the fourth aspect, the processor is configured to: obtain, based on the behavior information of the moving obstacle, a target avoidance strategy corresponding to the behavior information of the moving obstacle from a preset mapping relationship, where the mapping relationship includes a correspondence relationship between the behavior information of the moving obstacle and the avoidance strategy for the vehicle; and use the target avoidance strategy as the avoidance strategy for the vehicle.

In another implementation of the fourth aspect, the processor is further configured to: obtain at least one set of historical training data, where each set of historical training data includes the behavior information of the moving obstacle and the avoidance strategy for the vehicle in the case of a vehicle encountering a moving obstacle; and determine the correspondence relationship between the behavior information of the moving obstacle and the avoidance strategy for the vehicle based on the at least one set of historical training data.

In another implementation of the fourth aspect, the processor is further configured to: send the avoidance strategy for the vehicle to the moving obstacle, so that the moving obstacle determines, based on the avoidance strategy for the vehicle, a movement behavior of the moving obstacle at a next moment.

Optionally, the avoidance strategy includes at least one of accelerating, decelerating, stopping, or lane changing.

Optionally, the behavior information of the moving obstacle includes driving information or avoidance information.

In another implementation of the fourth aspect, the processor is specifically configured to: determine, based on the behavior information of the moving obstacle, that the avoidance strategy for the vehicle is at least one of decelerating, stopping, or lane changing in the case of the behavior information of the moving obstacle being the driving information.

In another implementation of the fourth aspect, the processor is specifically configured to: determine, based on the behavior information of the moving obstacle, that the avoidance strategy for the vehicle is accelerating or decelerating in the case of the behavior information of the moving obstacle being the avoidance information.

In a fifth aspect, the embodiments of the present disclosure provide a computer storage medium, where a computer program is stored in the storage medium, and the computer program, when executed, implements the method for avoidance control of a vehicle according to the first aspect or any implementation of the first aspect.

In a sixth aspect, the embodiments of the present disclosure provide a computer program product, where the program product includes a computer program stored in a readable storage medium, at least one processor of a device for avoidance control of a vehicle can read the computer program from the readable storage medium, and the at least one processor executes the computer program to cause the device for avoidance control of a vehicle to implement the method for avoidance control of a vehicle according to the first aspect.

The method and apparatus for avoidance control of a vehicle, the electronic device, and the storage medium provided in the embodiments of the present disclosure obtain behavior information of a moving obstacle, where the moving obstacle is located in a direction of movement of the vehicle and the distance between the moving obstacle and the vehicle satisfies a preset avoidance distance; determine an avoidance strategy for the vehicle based on the behavior information of the moving obstacle; and control movement of the vehicle based on the avoidance strategy. The method in the embodiments of the present disclosure considers the behavior information of the moving obstacle in the process of avoidance control of the vehicle, and the vehicle can be controlled to travel when the moving obstacle performs an avoidance action, so as to prevent the vehicle from unnecessary avoidance, which makes intelligent driving more in line with an actual situation, thereby improving the accuracy of avoidance for the vehicle and the practicality of intelligent driving.

BRIEF DESCRIPTION OF THE DRAWINGS

In order to illustrate the technical solutions of the embodiments of the present disclosure or the prior art more clearly, the drawings required in the description of the embodiments or the prior art will be briefly described below. Obviously, the drawings in the following description are only some embodiments of the present disclosure, and other drawings can be obtained according to these drawings by those skilled in the art without creative efforts.

DESCRIPTION OF EMBODIMENTS

Figure 1:
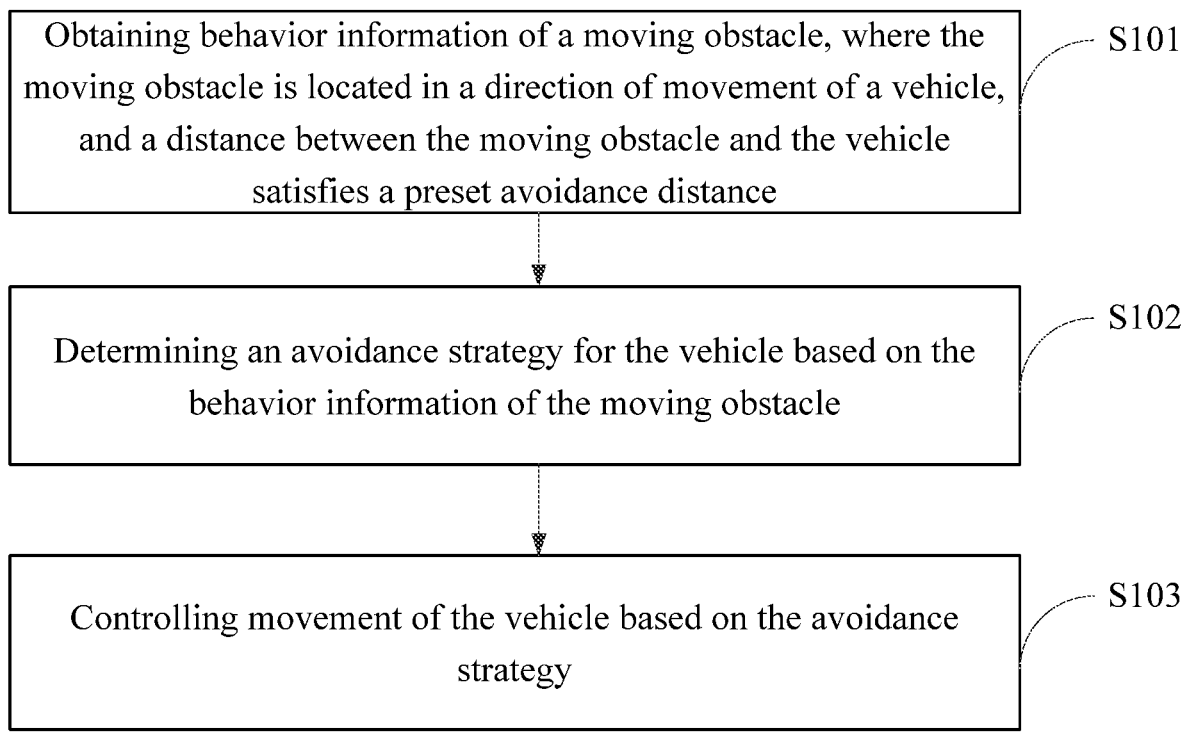
FIG. 1 is a flowchart of a method for avoidance control of a vehicle according to an embodiment of the present disclosure.

In order to make the objectives, technical solutions, and advantages of the embodiments of the present disclosure more clear, the technical solutions in the embodiments of the present disclosure will be clearly and completely described in the following with reference to the accompanying drawings of the embodiments of the present disclosure. It is obvious that the described embodiments are only part of embodiments of the present disclosure, but not all embodiments. All other embodiments obtained by those skilled in the art based on the embodiments of the present disclosure without creative efforts are within the scope of protection of the present disclosure.

In the present disclosure, "and/or" describes an association relationship of associated objects, indicating that there may be three kinds of relationships. For example, A and/or B can indicate situations that A exists alone, A and B exist simultaneously, and B exists alone, where A and B can be singular or plural. The character "/" generally indicates that there is an "or" relationship between the associated objects. "At least one of the following" or a similar expression refers to any combination of these items, including any combination of single or plural items. For example, at least one of a, b, or c can indicate: a, b, c, a-b, a-c, b-c, or a-b-c, where a, b and c may be single or multiple.

An existing avoidance method predicts, in the process of intelligent driving, a movement state of an obstacle at the next moment based on the movement state of the obstacle at the current moment. When the predicted result is that a collision will occur, the intelligent driving system will take active avoidance measures, such as decelerating or stopping. However, when the obstacle (for example, a pedestrian) takes an avoidance action, the vehicle does not need to decelerate or stop to avoid, but can travel as normal. But the existing method does not take this into consideration, which leads to the inaccuracy of intelligent driving in the avoidance process.

In order to solve the above technical problem, the method for avoidance control provided in the embodiments of the present disclosure determines an avoidance strategy for a vehicle based on behavior information of a moving obstacle, and controls movement of the vehicle based on the avoidance strategy. In this way, the behavior information of the moving obstacle is taken into consideration when determining the avoidance strategy for the vehicle. When the behavior information of the moving obstacle is avoidance, the vehicle can be controlled to travel normally without avoiding, thereby improving the accuracy of intelligent driving of the vehicle.

The method in the embodiments of the present disclosure may be applied to an electronic device, such as a terminal device, a computer system, or a server, which can operate with many other general or special-purpose computing systems environments or configurations. Well-known examples of a terminal device, a computing system, an environments and/or a configuration that are suitable for use with the electronic device, such as the terminal device, the computer system or the server, include but not limited to: a personal computer system, a server computer system, a thin client, a thick client, a handheld or laptop device, a system based on microprocessor, CPU or GPU, a set-top box, a programmable consumer electronic product, a network personal computer, a small computer system, a mainframe computer system, and a distributed cloud computing technology environment including any of the above systems.

The electronic device, such as the terminal device, the computer system, and the server may be described in the general context of computer system executable instructions (such as program modules) executed by a computer system. Generally, program modules may include a routine, a program, a target program, a component, logic, a data structure, and so on, which perform specific tasks or implement specific abstract data types. The computer system/server may be implemented in a distributed cloud computing environment. In the distributed cloud computing environment, tasks are performed by remote processing devices linked through a communication network. In the distributed cloud computing environment, program modules may be located on a local or remote computing system storage medium including a storage device.

The technical solutions of the present disclosure will be described in detail below with specific embodiments. The following specific embodiments may be combined with each other, and the same or similar concepts or processes may not be described in some embodiments.

FIG. 1 is a flowchart of a method for avoidance control of a vehicle according to an embodiment of the present disclosure. As shown in FIG. 1, the method in the embodiment may include:

S101, obtaining behavior information of a moving obstacle, where the moving obstacle is located in a direction of movement of the vehicle, and a distance between the moving obstacle and the vehicle satisfies a preset avoidance distance.

The embodiment of the present disclosure takes the execution subject being an electronic device as an example for description. The electronic device may be, but is not limited to, a smart phone, a computer, a vehicle-mounted system, or the like.

Optionally, the electronic device in the embodiment of the present disclosure may further have a camera, which can capture the driving environment of the vehicle, for example, capturing the front (or around) of the road on which the vehicle is traveling, generating a drive test image, and sending the drive test image to the processor of the electronic device.

Optionally, the electronic device in the embodiment may be connected to an external camera, which can capture the driving environment of the vehicle and generate the drive test image, and the electronic device may obtain the drive test image from the camera.

Optionally, the electronic device is further connected to a driving recorder and obtains the drive test image from the driving recorder.

Next, the electronic device processes the obtained drive test image to determine the behavior information of the moving obstacle.

For example, based on image recognition technology, a movable obstacle located in the direction of movement of the vehicle and having a distance from the vehicle that satisfies a preset avoidance distance is identified from obtained multiple consecutive drive test images, and is recorded as the moving obstacle. At the same time, the behavior information of the moving obstacle is identified from the multiple consecutive drive test images. The specific determination process may refer to the existing technology, and will not be repeated here.

Optionally, the moving obstacle in the embodiment of the present disclosure may be any objects that can identify the driving state of the vehicle and can determine their own behavior information based on the driving state of the vehicle, such as a pedestrian, a vehicle, and a robot.

Optionally, the behavior information of the moving obstacle in the embodiment of the present disclosure includes driving information or avoidance information. The driving information means that when the vehicle approaches, the moving obstacle still drives in a direction in which it may collide with the vehicle. The avoidance information is information on avoidance actions, such as decelerating or stopping, by the moving obstacle when the vehicle approaches.

The intelligent driving involved in the embodiment of the present disclosure includes autonomous driving and assisted driving.

S102, determining an avoidance strategy for the vehicle based on the behavior information of the moving obstacle.

According to the above steps, after the behavior information of the moving obstacle is obtained, the avoidance strategy for the vehicle is determined based on the behavior information of the moving obstacle.

Optionally, the avoidance strategy for the vehicle includes at least one of accelerating, decelerating, stopping, or lane changing.

Exemplarily, when the obtained behavior information of the moving obstacle is avoidance information, the avoidance strategy for the vehicle is determined to be accelerating or decelerating based on the behavior information of the moving obstacle.

For example, when the moving obstacle stops moving, it can be determined that the avoidance strategy for the vehicle is to keep the current driving speed and travel along the route normally, or accelerating or decelerating. For example, when the moving obstacle decelerates, it can be determined that the avoidance strategy for the vehicle is decelerating and/or lane changing. In this way, the vehicle can keep traveling when the moving obstacle takes an avoidance action, thereby prevent the vehicle from unnecessary avoidance, which makes intelligent driving more in line with the actual situation, thereby improving the accuracy of avoidance for the vehicle and the practicality of intelligent driving.

Exemplarily, when the obtained behavior information of the moving obstacle is driving information, it is determined, based on the behavior information of the moving obstacle, that the avoidance strategy for the vehicle is at least one of decelerating, stopping, or lane changing to avoid collision with the moving obstacle in motion.

S103, controlling movement of the vehicle based on the avoidance strategy.

After the avoidance strategy for the vehicle is determined according to the above steps, the movement of the vehicle is controlled based on the avoidance strategy.

Optionally, if the electronic device in the embodiment of the present disclosure does not have an intelligent driving control function, the determined avoidance strategy may be sent to the intelligent driving system of the vehicle, so that the intelligent driving system controls the movement of the vehicle based on the avoidance strategy.

Optionally, the electronic device in the embodiment of the present disclosure has an intelligent driving function, and the electronic device may directly control the movement of the vehicle based on the determined avoidance strategy.

The method for avoidance control of a vehicle provided in the embodiment of the present disclosure obtains the behavior information of the moving obstacle, where the moving obstacle is located in the direction of movement of the vehicle and the distance between the moving obstacle and the vehicle satisfies a preset avoidance distance; determines the avoidance strategy for the vehicle based on the behavior information of the moving obstacle; and controls the movement of the vehicle based on the avoidance strategy. The method in the embodiment of the present disclosure considers the behavior information of the moving obstacle in the process of avoidance control of the vehicle, and the vehicle can be controlled to travel when the moving obstacle takes an avoidance action, so as to prevent the vehicle from unnecessary avoidance, which makes intelligent driving more in line with the actual situation, thereby improving the accuracy of avoidance for the vehicle and the practicality of intelligent driving.

Figure 2:
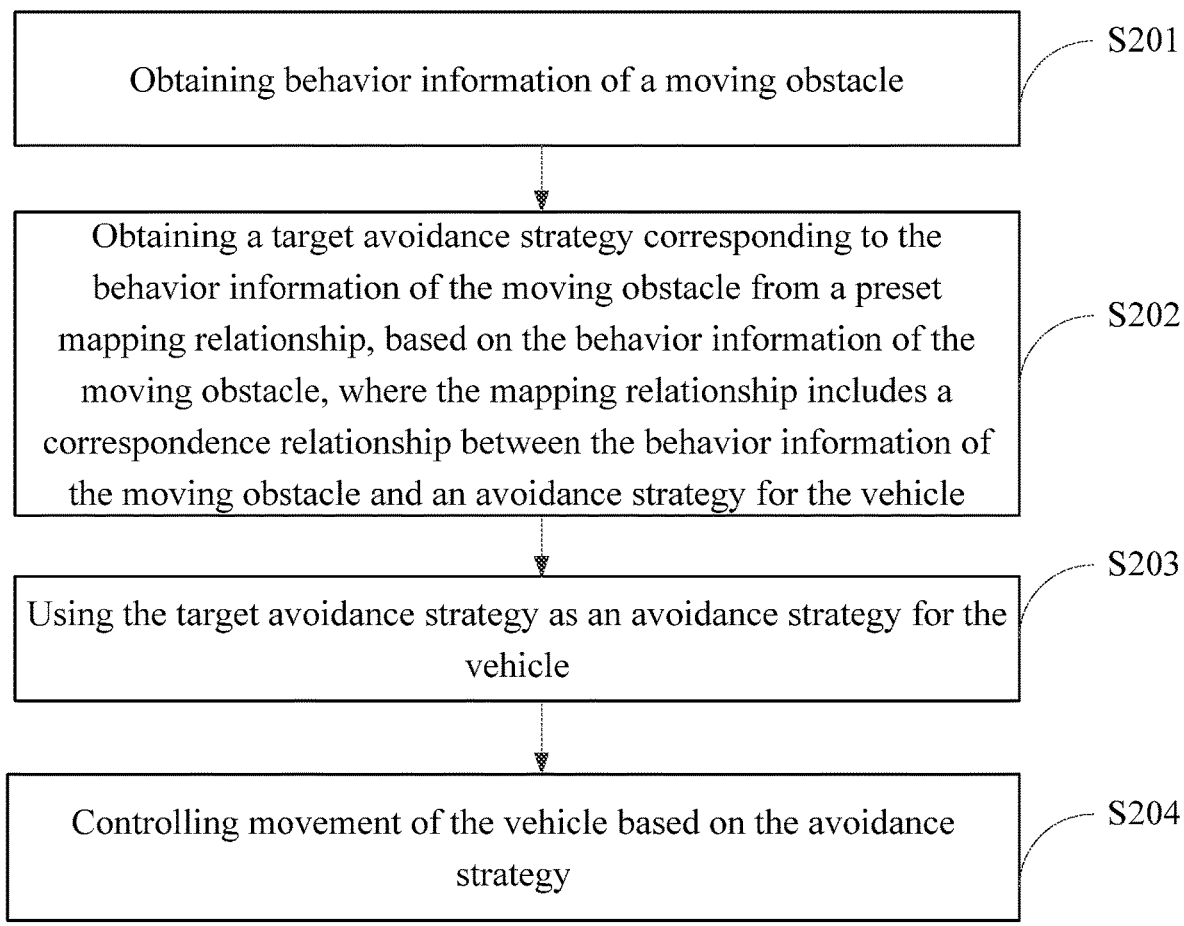
FIG. 2 is a flowchart of a method for avoidance control of a vehicle according to an embodiment of the present disclosure.

FIG. 2 is a flowchart of a method for avoidance control of a vehicle according to an embodiment of the present disclosure. Based on the foregoing embodiment, the method of the embodiment of the present disclosure may include:

S201, obtaining the behavior information of the moving obstacle.

The execution process of S201 is the same as that of the above S101, and reference may be made to the specific description of the above S101, and details are not described herein again.

S202, obtaining a target avoidance strategy corresponding to the behavior information of the moving obstacle from a preset mapping relationship, based on the behavior information of the moving obstacle, where the mapping relationship includes a correspondence relationship between the behavior information of the moving obstacle and the avoidance strategy for the vehicle.

S203, using the target avoidance strategy as an avoidance strategy for the vehicle.

It should be noted that the above S202 and S203 are an implementation of the above S102.

The preset mapping relationship is the correspondence relationship between different behavior information of the obstacle and different avoidance strategies for the vehicle. For example, when the behavior information of the obstacle is stopping, the corresponding avoidance strategy for the vehicle is driving normally at the current speed along the current route.

Optionally, the preset mapping relationship is stored in the electronic device in the embodiment of the present disclosure. In this way, the electronic device can query the preset mapping relationship to obtain the target avoidance strategy corresponding to the behavior information of the obstacle, based on the obtained behavior information of the obstacle, and use the target avoidance strategy as the avoidance strategy for the vehicle.

Optionally, the electronic device in the embodiment of the present disclosure may send the obtained behavior information of the moving obstacle to a network end, and the network end stores the preset mapping relationship. In this way, the network end can query the preset mapping relationship to obtain the target avoidance strategy corresponding to the behavior information of the obstacle, based on the behavior information of the moving obstacle, and send the target avoidance strategy to the electronic device.

It can be known from the foregoing that if the electronic device stores the preset mapping relationship, then before S202, the method in the embodiment of the present disclosure further includes the following step A and step B:

step A, obtaining at least one set of historical training data, where each set of historical training data includes the behavior information of the moving obstacle and the avoidance strategy for the vehicle in the case of a vehicle encountering a moving obstacle;

step B, determining the correspondence relationship between the behavior information of the moving obstacle and the avoidance strategy for the vehicle based on the at least one set of historical training data.

That is, the electronic device in the embodiment of the present disclosure determines, based on the historical training data, the correspondence relationship between the behavior information of the moving obstacle and the avoidance strategy for the vehicle. Specifically, the electronic device obtains at least one set of historical training data, where each set of historical training data includes the behavior information of the moving obstacle and the avoidance strategy for the vehicle in the case of a vehicle encountering a moving obstacle.

Optionally, the historical training data may be obtained from the historical data of a driving recorder. That is, the behavior information of the moving obstacle and the avoidance strategy for the vehicle (that is, the movement state of the vehicle) in the case of a vehicle encountering a moving obstacle are obtained from the data recorded on the driving recorder.

Optionally, the historical training data may further be input by a user.

The embodiment of the present disclosure may further obtain historical training data in other ways, which is not limited in the embodiment of the present disclosure.

After obtaining the at least one set of historical training data, the electronic device performs learning and determines the correspondence relationship between the behavior information of the moving obstacle and the avoidance strategy for the vehicle.

S204, controlling movement of the vehicle based on the avoidance strategy.

The execution process of S204 is the same as that of the above S103, and reference may be made to the specific description of the above S103, and details are not described herein again.

The avoidance control method for the vehicle provided in the embodiment of the present disclosure determines, based on the at least one set of historical training data, the correspondence relationship between the behavior information of the moving obstacle and the avoidance strategy for the vehicle, and obtains, based on the behavior information of the moving obstacle, the target avoidance strategy corresponding to the behavior information of the moving obstacle from the mapping relationship, and uses the target avoidance strategy as the avoidance strategy for the vehicle, thereby accurately determining the avoidance strategy for the vehicle.

Figure 3:
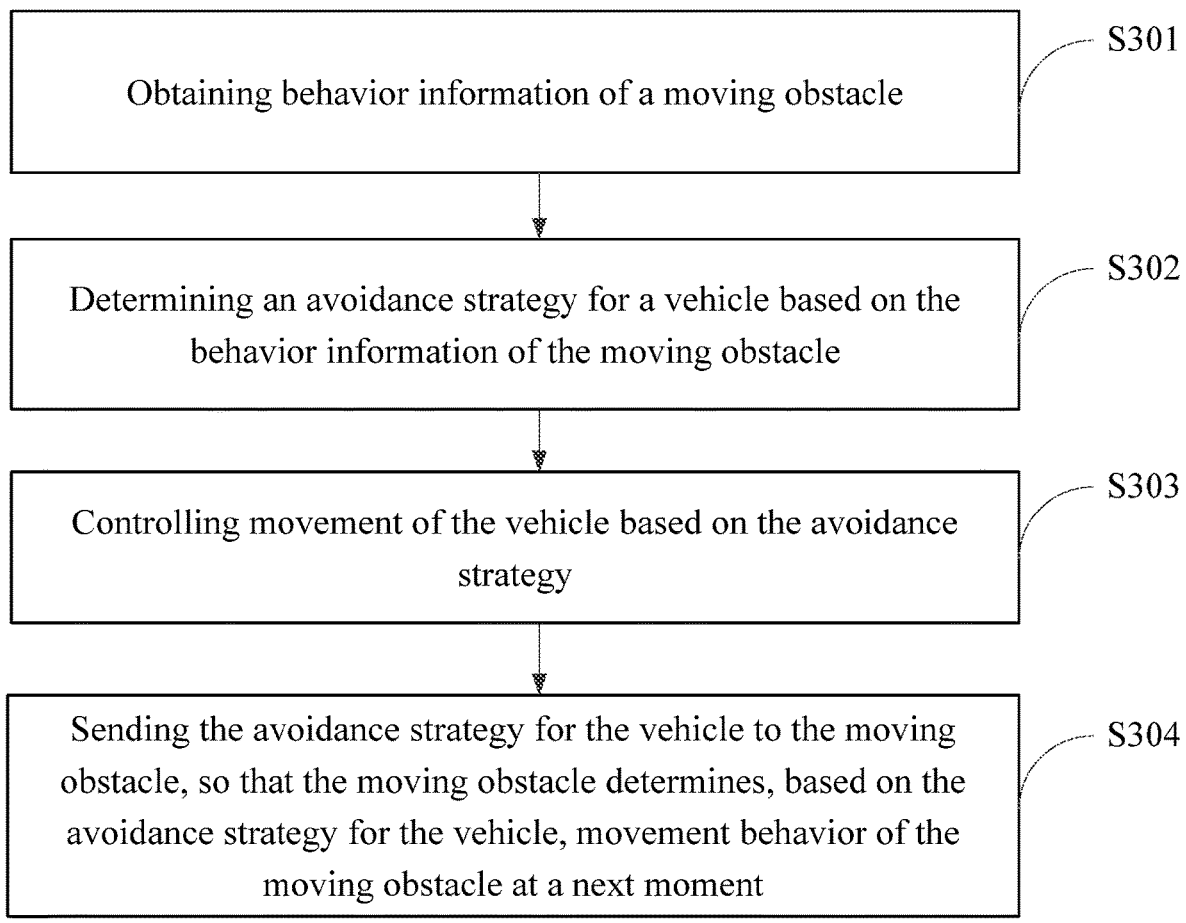
FIG. 3 is a flowchart of a method for avoidance control of a vehicle according to an embodiment of the present disclosure.

FIG. 3 is a flowchart of a method for avoidance control of a vehicle according to an embodiment of the present disclosure. Based on the foregoing embodiments, the method of the embodiment of the present disclosure may include:

S301, obtaining the behavior information of the moving obstacle.

S302, determining the avoidance strategy for the vehicle based on the behavior information of the moving obstacle.

S303, controlling the movement of the vehicle based on the avoidance strategy.

The above S301 to S303 may refer to the specific description of the above S101 to S103, or the above S301 to S303 may refer to the specific description of the above S201 to S204, and details are not described herein.

S304, sending the avoidance strategy for the vehicle to the moving obstacle, so that the moving obstacle determines, based on the avoidance strategy for the vehicle, movement behavior of the moving obstacle at a next moment.

It should be noted that S303 and S304 are not related in sequence, that is, S304 may be performed before the above S303, or may be performed after the above S303.

In the method of the embodiment of the present disclosure, after the avoidance strategy for the vehicle is determined based on the behavior information of the moving obstacle, not only the movement of the vehicle is controlled based on the avoidance strategy, but the avoidance strategy is also sent to the moving obstacle. In this way, the moving obstacle can obtain the movement state of the vehicle at the next moment based on the avoidance strategy for the vehicle, and determine how to move at the next moment based on the movement state of the vehicle at the next moment. For example, when the avoidance strategy for the vehicle is to drive normally, the moving obstacle determines that its own motion state at the next moment is to stop moving. For example, when the avoidance strategy for the vehicle is stopping, in order to prevent the vehicle from waiting for too much time, the moving obstacle determines that its own movement state at the next moment is accelerating.

Optionally, when the moving obstacle in the present disclosure is a pedestrian, the avoidance strategy for the vehicle may be sent to the terminal device of the pedestrian, so that the pedestrian learns the avoidance strategy for the vehicle from the terminal device.

Optionally, when the moving obstacle in the present disclosure is an object such as a vehicle or a robot which has a control device, the avoidance strategy for the vehicle may be sent to the control device of the vehicle or robot, so that the control device of the vehicle or robot determines its own movement state based on the avoidance strategy for the vehicle.

In the embodiment of the present disclosure, the safety of the obstacle can be improved by sending the avoidance strategy for the vehicle to the moving obstacle.

Those skilled in the art will understand that all or part of the steps to implement the method embodiments described above may be accomplished by hardware related to program instructions. The aforementioned program may be stored in a computer readable storage medium. The program, when executed, performs the steps included in the foregoing method embodiments; and the foregoing storage medium includes various media that can store program codes, such as a ROM, a RAM, a magnetic disk, or an optical disk.

Figure 4:
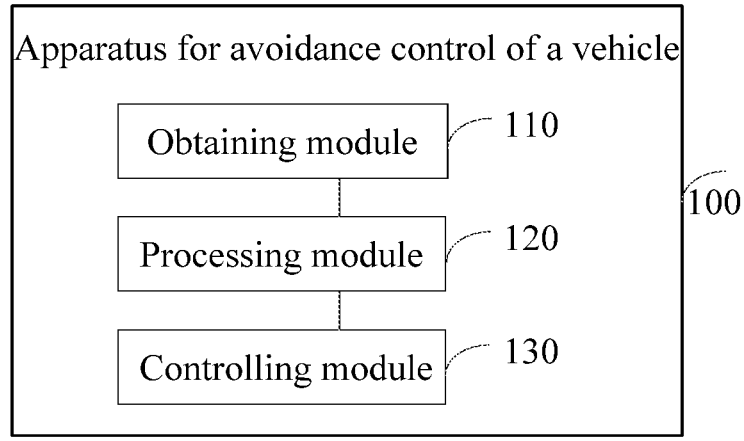
FIG. 4 is an apparatus for avoidance control of a vehicle according to an embodiment of the present disclosure.

FIG. 4 is an apparatus for avoidance control of a vehicle according to an embodiment of the present disclosure. As shown in FIG. 4, the avoidance control apparatus for the vehicle 100 includes:

an obtaining module 110, configured to obtain behavior information of a moving obstacle, wherein the moving obstacle is located in a direction of movement of the vehicle, and a distance between the moving obstacle and the vehicle satisfies a preset avoidance distance;

a processing module 120, configured to determine an avoidance strategy for the vehicle based on the behavior information of the moving obstacle; and a controlling module 130, configured to control movement of the vehicle based on the avoidance strategy.

The apparatus for avoidance control of a vehicle in the embodiment may be used to perform the technical solutions of the various method embodiments described above. The implementation principles and technical effects are similar, and are not described herein again.

In an implementation of the embodiment of the present disclosure, the processing module 120 is specifically configured to: obtain, based on the behavior information of the moving obstacle, a target avoidance strategy corresponding to the behavior information of the moving obstacle from a preset mapping relationship, where the mapping relationship includes a correspondence relationship between the behavior information of the moving obstacle and the avoidance strategy for the vehicle; and use the target avoidance strategy as the avoidance strategy for the vehicle.

In an implementation of the embodiment of the present disclosure, the obtaining module 110 is further configured to obtain at least one set of historical training data, where each set of historical training data includes the behavior information of the moving obstacle and the avoidance strategy for the vehicle in the case of a vehicle encountering a moving obstacle.

The processing module 120 is further configured to determine the correspondence relationship between the behavior information of the moving obstacle and the avoidance strategy for the vehicle based on the at least one set of historical training data.

Figure 5:
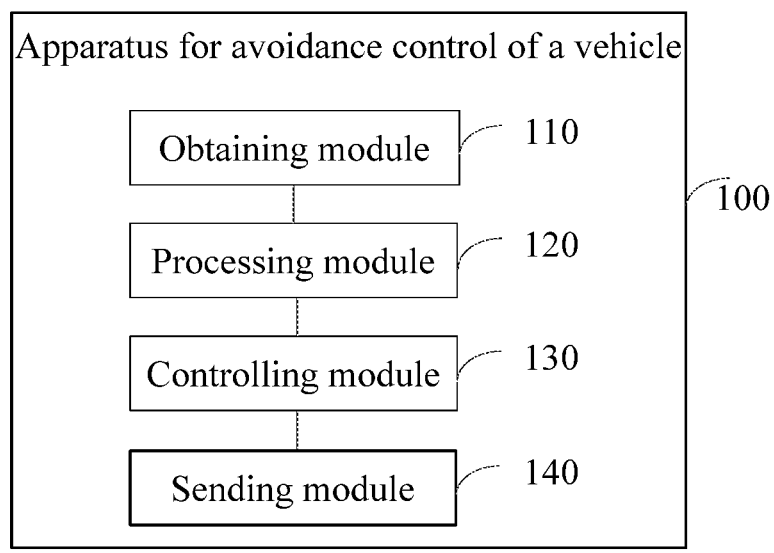
FIG. 5 is an apparatus for avoidance control of a vehicle according to an embodiment of the present disclosure.

FIG. 5 is an apparatus for avoidance control of a vehicle provided by an embodiment of the present disclosure. As shown in FIG. 5, based on the above embodiment, the apparatus 100 for avoidance control of a vehicle in the embodiment of the present disclosure further includes:

a sending module 140, configured to send the avoidance strategy for the vehicle to the moving obstacle, so that the moving obstacle determines, based on the avoidance strategy for the vehicle, a movement behavior of the moving obstacle at a next moment.

Optionally, the avoidance strategy includes at least one of accelerating, decelerating, stopping, or lane changing.

Optionally, the behavior information of the moving obstacle includes driving information or avoidance information.

In an example, the processing module 120 is specifically configured to determine, based on the behavior information of the moving obstacle, that the avoidance strategy for the vehicle is at least one of the decelerating, stopping, or lane changing in the case of the behavior information of the moving obstacle being the driving information.

In an example, the processing module 120 is configured to determine, based on the behavior information of the moving obstacle, that the avoidance strategy for the vehicle is accelerating or decelerating in the case of the behavior information of the moving obstacle being the avoidance information.

The apparatus for avoidance control of a vehicle in the embodiment may be used to perform the technical solutions of the various method embodiments described above. The implementation principles and technical effects thereof are similar, and are not described herein again.

Figure 6:
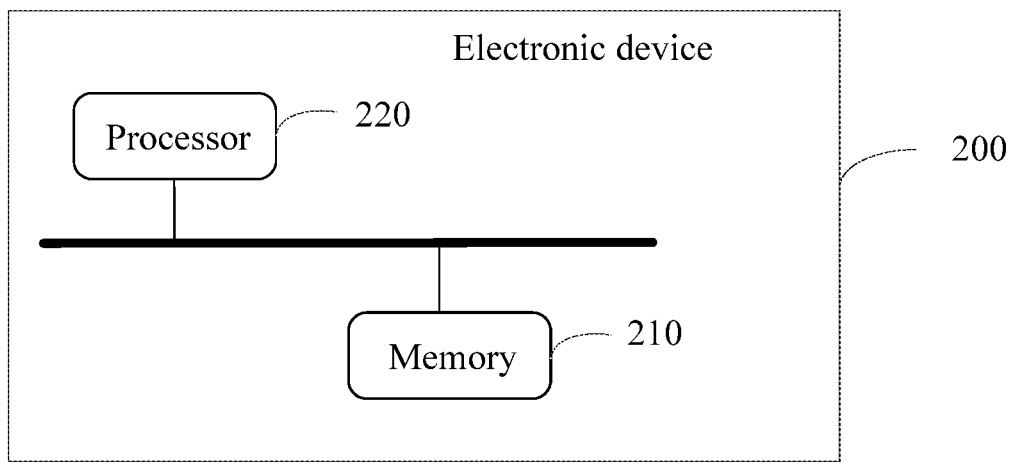
FIG. 6 is a schematic structural diagram of an electronic device according to an embodiment of the present disclosure.

FIG. 6 is a schematic structural diagram of an electronic device according to an embodiment of the present disclosure. As shown in FIG. 6, the electronic device 200 of the embodiment includes:

a memory 210, configured to store a computer program; and a processor 220, configured to execute the computer program to implement the above method for avoidance control of a vehicle, and the implementation principles and technical effects thereof are similar, and details are not described herein again.

Figure 7:
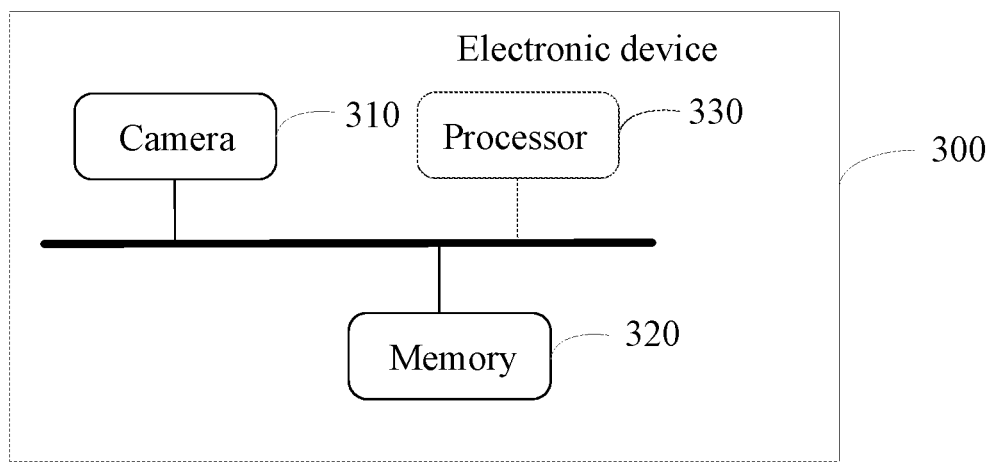
FIG. 7 is a schematic structural diagram of an electronic device according to an embodiment of the present disclosure.

FIG. 7 is a schematic structural diagram of an electronic device according to an embodiment of the present disclosure. As shown in FIG. 7, the electronic device 300 in the embodiment includes:

a camera 310, configured to take a drive test image, where the drive test image includes a moving obstacle;

a memory 320, configured to store a computer program; and a processor 330, configured to execute the computer program, and the processor 330 is specifically configured to:

obtain behavior information of the moving obstacle based on the drive test image taken by the camera 310, where the moving obstacle is located in a direction of movement of a vehicle, and a distance between the moving obstacle and the vehicle satisfies a preset avoidance distance;

determine an avoidance strategy for the vehicle based on the behavior information of the moving obstacle; and control movement of the vehicle based on the avoidance strategy.

The electronic device of the vehicle in the embodiment may be used to implement the technical solutions of the various method embodiments described above, and the implementation principles and technical effects thereof are similar, and are not described herein again.

Based on this understanding, in the technical solutions of the present disclosure, the part that is essentially or contributes to the existing technology, or all or part of the technical solutions can be embodied in the form of a software product, where the computer software product is stored in a storage medium and includes a number of instructions to enable a computer device (which may be a personal computer, a server, a network device, or the like) or a processor to perform all or part of the steps of the method described in the embodiments of the present disclosure. The foregoing storage medium include various media that can store program codes, such as a U disk, a mobile hard disk, a read-only memory (ROM), a random access memory (RAM), a magnetic disk or a compact disc.

The above embodiments may be implemented in whole or in part by software, hardware, firmware, or any combination thereof. When implemented in software, they may be implemented in whole or in part in the form of a computer program product. The computer program product includes one or more computer instructions. When the computer program instructions are loaded and executed on a computer, the processes or functions according to the embodiments of the present disclosure are wholly or partially generated. The computer may be a general-purpose computer, a special-purpose computer, a computer network, or other programmable device. The computer instructions may be stored in a computer readable storage medium, or transmitted from one computer readable storage medium to another computer readable storage medium. For example, the computer instructions may be transmitted from a web site, a computer, a server, or a data center to another web site, computer, server, or data center by wire (such as coaxial cable, fiber optic, digital subscriber line (DSL)) or wireless (such as infrared, wireless, microwave, etc.). The computer readable storage medium may be any available medium that can be accessed by the computer or a data storage device, such as a server or a data center, which is integrated with one or more available media. The available medium may be a magnetic medium (for example, a floppy disk, a hard disk, a magnetic tape), an optical medium (for example, a DVD), a semiconductor medium (for example, a solid state disk (SSD)), or the like.

Finally, it should be noted that the above embodiments are merely used to illustrate the technical solutions of the present disclosure, rather than limiting them. Although the present disclosure has been described in detail with reference to the foregoing embodiments, those skilled in the art should understand that the technical solutions described in the foregoing embodiments may be modified, or some or all of the technical features may be equivalently substituted; and the modifications or substitutions do not deviate the essence of the corresponding technical solutions from the scope of the technical solutions of the embodiments of the present disclosure.

What is claimed is:

1. A method comprising:
   obtaining behavior information of a moving obstacle, wherein the moving obstacle is located in a direction of movement of the vehicle, and a distance between the moving obstacle and the vehicle satisfies a preset avoidance distance;
   determining an avoidance strategy for the vehicle based on the behavior information of the moving obstacle;
   controlling movement of the vehicle based on the avoidance strategy; and
   sending the avoidance strategy for the vehicle to the moving obstacle;
   wherein the sending the avoidance strategy for the vehicle to the moving obstacle comprises, when the moving obstacle is a pedestrian, sending the avoidance strategy for the vehicle to a terminal device of the pedestrian, so that the pedestrian learns the avoidance strategy for the vehicle from the terminal device.

2. The method according to claim 1, wherein the determining the avoidance strategy for the vehicle based on the behavior information of the moving obstacle comprises:
   obtaining, based on the behavior information of the moving obstacle, a target avoidance strategy corresponding to the behavior information of the moving obstacle from a preset mapping relationship, wherein the mapping relationship comprises a correspondence relationship between the behavior information of the moving obstacle and the avoidance strategy for the vehicle; and
   using the target avoidance strategy as the avoidance strategy for the vehicle.

3. The method according to claim 2, wherein the method further comprises:
   obtaining at least one set of historical training data, wherein each set of historical training data comprises the behavior information of the moving obstacle and the avoidance strategy for the vehicle in the case of a vehicle encountering a moving obstacle; and
   determining the correspondence relationship between the behavior information of the moving obstacle and the avoidance strategy for the vehicle based on the at least one set of historical training data.

4. The method according to claim 1, wherein the determining an avoidance strategy for the vehicle based on the behavior information of the moving obstacle comprises:
   determining the avoidance strategy for the vehicle is at least one of accelerating, decelerating, stopping, or lane changing, based on the behavior information of the moving obstacle.

5. The method according to claim 2, wherein the determining an avoidance strategy for the vehicle based on the behavior information of the moving obstacle comprises:
   determining the avoidance strategy for the vehicle is at least one of accelerating, decelerating, stopping, or lane changing, based on the behavior information of the moving obstacle.

6. The method according to claim 3, wherein the determining an avoidance strategy for the vehicle based on the behavior information of the moving obstacle comprises:
   determining the avoidance strategy for the vehicle is at least one of accelerating, decelerating, stopping, or lane changing, based on the behavior information of the moving obstacle.

7. The method according to claim 4, wherein the behavior information of the moving obstacle comprises driving information of the moving obstacle or avoidance information of the moving obstacle.

8. The method according to claim 7, wherein the determining an avoidance strategy for the vehicle based on the behavior information of the moving obstacle comprises:
   determining, based on the behavior information of the moving obstacle, that the avoidance strategy for the vehicle is at least one of decelerating, stopping, or lane changing in the case of the behavior information of the moving obstacle being the driving information.

9. The method according to claim 7, wherein the determining an avoidance strategy for the vehicle based on the behavior information of the moving obstacle comprises:
   determining, in the case of the behavior information of the moving obstacle being the avoidance information, that the avoidance strategy for the vehicle is moving normally, accelerating or decelerating, in the case of the moving obstacle stopping moving; or
   determining, in the case of the behavior information of the moving obstacle being the avoidance information, that the avoidance strategy for the vehicle is decelerating and/or lane changing, in the case of the moving obstacle decelerating.

10. An electronic device, comprising:
    a memory, configured to store a computer program; and
    a processor, configured to execute the computer program to:
    obtain behavior information of a moving obstacle, wherein the moving obstacle is located in a direction of movement of the vehicle, and a distance between the moving obstacle and the vehicle satisfies a preset avoidance distance;
    determine an avoidance strategy for the vehicle based on the behavior information of the moving obstacle;
    control movement of the vehicle based on the avoidance strategy; and
    send the avoidance strategy for the vehicle to the moving obstacle;

wherein the processor is configured to execute the computer program to, when the moving obstacle is a pedestrian, send the avoidance strategy for the vehicle to a terminal device of the pedestrian, so that the pedestrian learns the avoidance strategy for the vehicle from the terminal device.

11. The electronic device according to claim 10, wherein the processor is configured to execute the computer program to:
obtain, based on the behavior information of the moving obstacle, a target avoidance strategy corresponding to the behavior information of the moving obstacle from a preset mapping relationship, wherein the mapping relationship comprises a correspondence relationship between the behavior information of the moving obstacle and the avoidance strategy for the vehicle; and
use the target avoidance strategy as the avoidance strategy for the vehicle.

12. The electronic device according to claim 11, wherein the processor is further configured to execute the computer program to:
obtain at least one set of historical training data, wherein each set of historical training data comprises the behavior information of the moving obstacle and the avoidance strategy for the vehicle in the case of a vehicle encountering a moving obstacle; and
determine the correspondence relationship between the behavior information of the moving obstacle and the avoidance strategy for the vehicle based on the at least one set of historical training data.

13. The electronic device according to claim 10, wherein the processor is configured to execute the computer program to:
determine the avoidance strategy for the vehicle is at least one of accelerating, decelerating, stopping, or lane changing, based on the behavior information of the moving obstacle.

14. The electronic device according to claim 13, wherein the behavior information of the moving obstacle comprises driving information of the moving obstacle or avoidance information of the moving obstacle.

15. The electronic device according to claim 14, wherein the processor is configured to execute the computer program to:
determine, based on the behavior information of the moving obstacle, that the avoidance strategy for the vehicle is at least one of decelerating, stopping, or lane changing in the case of the behavior information of the moving obstacle being the driving information.

16. The electronic device according to claim 14, wherein the processor is configured to execute the computer program to: determine, in the case of the behavior information of the moving obstacle being the avoidance information, that the avoidance strategy for the vehicle is moving normally, accelerating or decelerating, in the case of the moving obstacle stopping moving; or determine, in the case of the behavior information of the moving obstacle being the avoidance information, that the avoidance strategy for the vehicle is decelerating and/or lane changing, in the case of the moving obstacle decelerating.

17. An electronic device, comprising:
a camera, configured to take a drive test image, wherein the drive test image comprises a moving obstacle, wherein the moving obstacle is located in a direction of movement of the vehicle, and a distance between the moving obstacle and the vehicle satisfies a preset avoidance distance; and
a processor, configured to obtain behavior information of the moving obstacle based on the drive test image taken by the camera, determine an avoidance strategy for the vehicle based on the behavior information of the moving obstacle, control movement of the vehicle based on the avoidance strategy, and send the avoidance strategy for the vehicle to the moving obstacle;
wherein the processor is further configured to, when the moving obstacle is a pedestrian, send the avoidance strategy for the vehicle to a terminal device of the pedestrian, so that the pedestrian learns the avoidance strategy for the vehicle from the terminal device.

18. A non-transitory computer storage medium, wherein a computer program is stored in the storage medium, and the computer program, when executed, implements the method according to claim 1.

* * * * *